3,022,291
PROCESS FOR THE MANUFACTURE OF CAPROLACTAM
Werner Muench, Cesano Maderno, and Luigi Notarbartolo and Giuliana Silvestri, Milan, Italy, assignors to Snia Viscosa Società Nazionale, Industria Applicazioni Viscosa S.p.A., Milan, Italy, a company of Italy
No Drawing. Filed Sept. 14, 1959, Ser. No. 839,597
Claims priority, application Italy Sept. 18, 1958
9 Claims. (Cl. 260—239.3)

The present invention relates to the manufacture of caprolactam, an important raw materail for the preparation of synthetic linear polymers.

It is an object of this invention to provide a process for the preparation of caprolactam.

It is another object of this invention to provide a process for the preparation of caprolactam directly in a single step reaction.

Other objects and advantages of this invention will appear hereinafter, and it will be seen that it constitutes a considerable technical progress over known processes for the production of caprolactam.

According to the invention, caprolactam is prepared in a single step reaction by the nitrosation in an acid medium of organic compounds containing in the molecule at least one cyclohexyl (or hydroaromatic) ring having one tertiary carbon atom.

A tertiary carbon atom is defined according to Grignard (Traité de Chimie Organique, Tome I, page 500, 1935 Ed.) as a carbon atom linked to only one hydrogen atom. The compounds used as starting compounds in this process can therefore be also defined as those corresponding to the general formula:

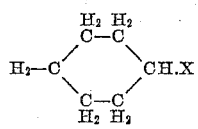

wherein "X" may represent: —COOH; a radical of a keto-acid (for instance

—CO.CH$_2$.CO.COOH, —CO.CO.C$_6$H$_5$

—CO.CO.C$_6$H$_{11}$, etc.); an acyl radical (for instance —CO.CH$_3$, —CO.C(CH$_3$)$_3$, —CO.CF$_3$, etc.).

The nitrosation of the aforementioned compounds is carried out in the presence of sulphuric acid and preferably in the presence of both sulphuric acid and sulphuric trioxide, that is in the presence of fuming sulphuric acid (oleum). In the reaction the cyclohexyl ring indicated in the above general formula generates a molecule of caprolactam. Thus one molecule of caprolactam per molecule of starting compound is generated, and another compound or compounds are also generated, the nature of which depends on the radical indicated in the general formula by X and linked to the tertiary carbon atom of the hydroaromatic ring.

Said additional compound or compounds may in turn be desirable products. If the radical X indicated in the general formula contains another cyclohexyl ring or more cyclohexyl rings having each tertiary carbon atom, each of these rings also generates one molecule of caprolactam in the reaction. Thus if the starting compound is hexahydrobenzoic acid, carbon dioxide is produced together with caprolactam.

If the starting compound is dicyclohexyl ketone, two mols of caprolactam are obtained for each mole of starting compound, and carbon dioxide is also formed.

If the starting compound is trimethyl acetyl cyclohexane, trimethylacetic acid is obtained in addition to caprolactam; and other examples will be given as the description proceeds.

Examples of nitrosation agents adapted for carrying out the invention, are for instance the following derivatives of nitrous acid:

Nitrosyl sulphuric acid; nitrosyl sulphuric anhydride; nitrosyl chloride and bromide; salts of nitrous acid such as sodium, potassuim or ammonium nitrite; alkyl nitrites of the general formula R.O.NO (where R is an alkyl radical) such as ethyl, amyl, propyl, butyl nitrite; nitrous anhydride or gases containing it; and nitrogen monoxide. Other nitrosation agents may be suitable.

When nitrosyl sulphuric acid is employed, it is to be noted that when it is heated in an acid medium, an amount of anhydride is always formed, therefore in practice a mixture of acid and anhydride is always present in the reaction. It is extremely difficult to establish the ratio of the one to the other in the mixture, and such ratio is without influence on the process. It is probable that practically 100% nitrosyl sulphuric anhydride is obtained when the acid is heated in an acid medium substantially above 100° C.

The invention is carried out by reacting the nitrosation agent and the sulphuric acid and sulphur trioxide, if any, with the starting compound (containing one or more cyclohexyl rings with a tertiary carbon atom).

The order in which the several reagents are mixed or brought to act upon one another is not essential but may be varied and is chosen from case to case as it may appear more convenient.

If all the reagents are liquid, they may be merely mixed in any preferred succession; or if the nitrosation agent is gaseous, as some of those cited hereinbefore are, the sulphuric acid and sulphur trioxide, if any, and the starting compound may be mixed and the gaseous nitrosation agent be passed through the mixture.

The molar ratio between the starting compound and the nitrosation agent may vary within wide limits, depending on the nature of the starting compound and the nitrosation agent. In most practical cases said ratio is comprised between about 10:1 and about 2:5, but those proportions are not limitative.

In calculating the above ratios, the nitrosation agent is expressed as NO. When the starting compound contains more than one cyclohexyl ring (as in the case of dicyclohexyl ketone) the molar ratio is of course calculated by multiplying the amount of starting compound by the number of cyclohexyl rings per molecule.

Preferably but not necessarily, 2.5 mols or more of sulphuric acid are used per mol of caprolactam calculated. Much higher amounts are useless but not harmful, except for the additional cost. In some cases (for instance when nitrosyl sulphuric acid is used) sulphuric acid is already included in the nitrosation agent, and this must be taken into account, in that less or no additional sulphuric acid may be required. If compounds which react with sulphuric acid, such as bases, are produced in the reaction, this of course requires a corresponding additional amount of sulphuric acid. When concentrated and not fuming sulphuric acid is used, it should have a concentration of substantially at least 85% by weight of H$_2$SO$_4$, that is, it should contain not more than 15 parts by weight of diluents for 85 parts of pure acid. If in the nitrosation there are formed compounds that do not react with sulphuric acid but dilute it, these diluents must be taken into account in figuring the final acid concentration.

The reaction temperatures may also vary within wide limits depending on the reagents used. The temperature might go as high as the boiling point of the acid under the reaction conditions, but high temperatures tend to cause objectionable formation of resinous products.

In most practical cases the temperatures are maintained between —20° C. and +200° C. Preferred temperature ranges for particular cases will be set forth as the description proceeds.

As a rule, however, the temperatures required at least towards the end of the reaction tend to increase firstly as the amount of free $SO_3$ in fuming sulphuric acid decreases and still further, if no free $SO_3$ is present, as the concentration of $H_2SO_4$ decreases. With concentrations of sulphuric acid as low as 85% by weight, it may be necessary to attain temperatures of at least 100° C. before the end of the reaction.

In some cases the nitrosation is so strongly exothermic that the temperature will rise uncontrolledly and exceed even 200° C. The time required for completing the reaction is extremely variable, it may last from few hours to some days, but in some cases it is practically instantaneous.

No pressure is required, though of course the reaction could be carried out even under pressure.

On carrying out the invention, the starting compounds preferably used because they give the best results, particularly very high yields, are hexahydrobenzoic acid and its derivatives and most ketones. When hexahydrobenzoic acid is used as a starting material, the molar ration between it and the nitrosation agent normally varies from about 10:1 to about 1:1, but is preferably higher than 1:1 and comprised in the interval from 3:1 to 1:1. Ratios lower than 1:1, corresponding therefore to an excess of nitrosation agent, give good results, as long as the excess is low. If the excess of nitrosation agent is strong, the reaction occurs but the yield is lower.

The best results are obtained with molar ratios slightly higher than unit.

In place of hexahydrobenzoic acid its derivatives can be used, such as its salts, for instance, the sodium, lithium, potassium, magnesium, calcium (in general, alkaline and earth-alkaline) salts, its esters, such as the methyl, propyl, amyl ester, its chloride, its anhydride, its nitrile or its amide.

These behave substantially as the acid insofar as the formation of caprolactam goes, but it should be noted that for instance the salts and the amide require larger amounts of sulphuric acid for the reasons set forth hereinbefore. Larger amounts of sulphuric acid then would otherwise be necessary, are also required no matter what the starting compound when the nitrosation agents are salts of nitrous acid or alkyl nitrites.

As to the reaction temperature, in principle, it may be carried out at any temperature. As a rule, it assumes an appreciable rate already at about 30° C. or above. However, if the reaction is carried out in the presence of strong amounts of free $SO_3$, considerably higher than those of the examples that will be given (wherein the amount of free $SO_3$ is generally about 10 to 20% by weight of the nitrosation mixture), the reaction may be carried out below 30° C. and even below 0° C.

In general it is advisable to attain in the course of reaction temperatures of at least 45° C. The time the reaction takes to go to completion depends on the temperature, for a given amount of sulphuric acid and $SO_3$, and completion of the reaction is evidenced by the end of the evolution of carbon dioxide, but it may be advisable to keep the reaction mixture at reaction conditions for a certain time (for instance, from a few minutes to an hour) thereafter.

As the reaction is strongly exothermic, a violent reaction may initiate, and reach high temperatures, to 200° C. and above, such a reaction being difficult to control, or it may take place completely at moderate temperature, more or less slowly. Consequently the temperatures and duration of the reaction are highly variable and the way carrying it out cannot be rigidly fixed.

Two typical ways are indicated hereinafter, but practical cases may conform more or less to one or the other or to neither.

According to a first way, the reactants are mixed at a comparatively low temperature, not substantially higher than 50° C. It should be borne in mind that by "mixing" is meant herein the mixing of all and not only of part of the reactants. For instance, the nitrosation agent might be mixed with concentrated or fuming sulphuric acid at a high temperature and then the mixture be cooled before adding hexahydrobenzoic acid or a derivative thereof; in such a case the mixing would be considered to have been effected at the temperature at which the last reactant was added. After mixing the reactants at a comparatively low temperature, the mixture is heated slightly—if needed—to a temperature at which absorption of NO ions begins without significant evolution of $CO_2$, for instance to from 30 to 50° C.—the required temperature depending on the form of the NO in the nitrosation agent—and the mixture is kept at that temperature until a part, for instance 50%, of the NO ions has been absorbed. It should be noted that the expression "significant evolution of $CO_2$" is used herein because at low temperatures at which the reaction takes place very slowly, an evolution of $CO_2$ necessarily takes place but so slowly as to be negligible. At the aforesaid point, the mixture is heated to about 60–70° C. However, when a temperature in said range has been reached, a violent reaction occurs accompanied by a sudden and marked rise in temperature, the course of which it is not always possible, and at any rate it is not easy to control.

The maximum temperature attained by the reaction mixture depends also, the reactants being equal, on many factors such as the efficiency of the cooling, the amounts processed, and other factors the effect of which cannot be specified in general: said temperature easily approaches 150° C. and may even exceed 200° C. Under the aforesaid operating conditions, the reaction is practically terminated when the rise in temperature ceases.

The above way of carrying out the reaction is suitable for a possible continuous process.

A second way of carrying out the reaction involves instead the addition of the nitrosation agent and of the sulphuric acid or oleum to hexahydrobenzoic acid or to a derivative therof kept at comparatively elevated temperature. That temperature may vary for instance from 45 to 100–150° C. In such a case, the absorption of NO takes place concurrently with the evolution of carbon dioxide and here also, the reaction terminates when the mixture is complete and the evolution of $CO_2$ ceases. A variant of this method consists in premixing all of the reactants at so low a temperature as not to produce any significant reaction, feeding the unreacted mixture into a preheated mass which may consist, for instance, of previously reacted product, and continuing to add the mixture at a rate depending on the control of the reaction temperature, which may be effected by any cooling means, for instance by external cooling, or by carrying out the reaction in the presence of fluids under reflux.

The typical modes of operation hereinbefore described are merely indicative, as many variants can be adopted in the preparation of mixtures of reactants and in the conditions of reaction. When operating by the methods described, the reaction is usually accomplished—once the reaction temperature has been attained—in a period of hours, from few hours to few tens of hours, but in some cases, it may be practically instantaneous.

It should be noted that one and the same temperature may be considered to be "comparatively high" or "comparatively low" according to the reactants employed, as these may require more or less high temperatures to react in a given manner.

The percentages in all the examples in the present description are by weight.

*Example 1*

The reaction is carried out in a 250 cc. flask provided with a stirrer, a thermometer reaching the bottom, and a dripping funnel. Into the flask are introduced 22.4 gr. of hexahydrobenzoic acid ($C_7H_{12}O_2$; M.P. 30–31° C.).

Through the dripping funnel are introduced in the course of 10 minutes' time and while stirring 33.6 gr. of a solution of 18.23 gr. of nitrosyl sulphate (prepared in accordance with "Inorganic Syntheses," volume I, page 55) in 15.37 gr. of concentrated (100%) sulphuric acid, the dripping of the mixture being adjusted in such a way that the temperature will not rise above 25° C. The hexahydrobenzoic acid to nitrosyl sulphate molar ratio is 1.2:1.

While cooling the flask externally and under stirring, 20.3 gr. of oleum with a 60% $SO_3$ content are then dripped in the course of 25 minutes at the temperature of 25° C. Stirring is continued for one further hour at 25° C. and then, after removing the cooling means from the flask, cautious heating is effected firstly for 10 hours at 30° C. and then for a further 10 hours at 30–32° C. After that time, no more NO ions are found in the reaction mixture. A further gradual increase of temperature causes firstly a slow evolution of $CO_2$, which becomes apparent at 35° C., and then a more vigorous evolution as the temperature further rises.

By continued heating the content of the flask is gradually brought-to 50° C., at which temperature a violent reaction initiates and the temperature rises spontaneously to 140° C. At that time the reaction is finished. The mass is allowed to cool down to room temperature and is then fractionated for instance as follows.

It is poured onto ice, extracted with ether, and two layers are thus obtained, an aqueous layer and an ether layer, which are separated by decanting. The aqueous layer is neutralised, firstly approximately with a 40% sodium hydroxide solution and then exactly to pH=7 with a 10% sodium carbonate solution, then it is completely extracted with chloroform and after extraction and evaporation of the solvent, 12.5 gr. of caprolactam, M.P. 63–66° C., are obtained.

The ether layer is treated with a 10% sodium carbonate solution, the resulting ether and aqueous layers are separated, and the aqueous layer is acidified. Hexahydrobenzoic acid precipitates in oily form. The dried ether layer leaves after evaporation a residue of 0.8 gr. of nitrogenous product of unidentified chemical composition. The precipitated oily hexahydrobenzoic acid can be treated with ether once again for purification. After drying and evaporation of the ether, about 5.4 gr. of crystallised hexahydrobenzoic acid, M.P. 30° C., are obtained.

Taking into account the acid recovered, the yield of caprolactam is 83.33% of the theoretical amount.

*Example 2*

An equipment like that of Example 1 is employed but of smaller size, the capacity of the flask being 100 cc.

Into the flask 23.9 gr. of hexahydrobenzoic acid are introduced, to which are added under stirring 33.6 gr. of a solution of 18.3 gr. of nitrosyl sulfate in 15.37 gr. of concentrated (100%) sulphuric acid, by dripping the mixture in the course of 10 minutes at a temperature of 30–32° C. The hexahydrobenzoic acid to nitrosyl sulphate molar ratio is 1.3:1.

Then in the course of 25 minutes, at the same temperature and under steady stirring and vigorous external cooling when needed, 20.3 gr. of oleum with 60% of $SO_3$ are dripped in. Subsequently the cooling bath is removed and cautious heating is effected. At 35° C. a slow evolution of $CO_2$ begins. The mass is stirred for 16 hours at 35° C., whereafter the temperature is raised to 40–45° C. and stirring is continued at that temperature for 4 further hours. At that time the evolution of carbon dioxide is terminated and no NO ions are any longer found in the mixture. Stirring is further continued for half an hour at 50° C., the mass is allowed to cool down and the reaction product is treated as in Example 1.

12.95 gr. of caprolactam, M.P. 61–64° C., are obtained; 5.15 gr. of hexahydrobenzoic acid and also 0.75 gr. of a nitrogenous by-product are recovered. Taking into account the hexahydrobenzoic acid recovered, the caprolactam yield is 78.2% of the theoretical amount.

*Example 3*

The equipment of Example 2 is used. Into the flask are introduced 24.9 gr. of the methyl ester of hexahydrobenzoic acid ($C_8H_{14}O_2$; B.P. at 15 mm. Hg, 67° C.). Into the dripping funnel are introduced 37.35 gr. of a solution of 18.23 gr. of nitrosyl sulphuric acid in 19.12 gr. of concentrated (100%) sulphuric acid, which is allowed to drip into the externally cooled flask, in the course of 10 minutes in such a way that the mixture under stirring keeps a temperature of 25° C. The ester to nitrosyl sulfate molar ratio is 1.22:1.

Now into the mixture are dripped under steady stirring and cooling at the same temperature, in the course of 15 minutes, 17.2 gr. of oleum with 60% of $SO_3$ and after removal of the cooling bath under cautious heating, stirring is continued for a further 4 hours and 40 minutes at a temperature from 27° to 30° C., at which a slow evolution of carbon dioxide begins. Stirring is continued for a further 15 hours at 30° C., then for 3.5 hours at 35° C., at which temperature the evolution of carbon dioxide becomes livelier, and the temperature is gradually brought in the course of a further 3.5 hours to 50° C. At that time the evolution of carbon dioxide is terminated and in the reaction mixture no NO ions are found any longer. Stirring is continued for a further half hour at 50° C., the mass is allowed to cool down, the reaction product is poured onto ice and is fractionated. For example it is extracted with ether, and the ether layer is separated from the aqueous layer. From the aqueous layer, in the manner described in Example 1, 14.32 gr. of caprolactam, M.P. 64–65° C., are obtained and after evaporation of the ether 5.62 gr. of unreacted ester of hexahydrobenzoic acid are recovered. Taking into account this recovered amount, the caprolactam yield is 93.3% of the theoretical amount.

*Example 4*

18.23 gr. of nitrosyl sulphate, 15.37 gr. of concentrated (100%) sulphuric acid and 17.2 gr. of oleum with 60% of $SO_3$, are heated for one hour to 100° C. under stirring. The mixture is allowed to cool down to 60° C. and it is dripped, using the equipment of Example 1, in the course of 15 minutes under stirring at a temperature of 30° to 35° C. into 23.9 gr. of hexahydrobenzoic acid. The hexahydrobenzoic acid to nitrosyl sulphate molar ratio is 1.3:1.

The temperature is raised to 50° C. and is maintained for 2 hours. A lively reaction initiates and the temperature rises spontaneously to 140° C. The reaction is then terminated. The reaction mixture, in which no NO ions are found any longer, is treated as in Example 1. 4.35 gr. of hexahydrobenzoic acid are recovered and 14.66 gr. of caprolactam are obtained, which, taking into account the acid recovered, is equivalent to a yield of 84.9% of the theoretical amount.

*Example 5*

A mixture of 36.46 gr. of nitrosyl sulphate, 23.54 gr. of concentrated (100%) sulphuric acid and 47.2 gr. of oleum with 23% of $SO_3$ is heated for 1 hour at 100° C. The mixture is allowed to cool down and is added dropwise under stirring to 44 gr. of hexahydrobenzoic acid heated to 60–65° C., in the equipment of Example 2, in such a way that with the sudden initiation of the exothermic reaction, the temperature stays at about 55–60° C. The hexahydrobenzoic acid to nitrosyl sulphate molar ratio is 1.2:1. A continuous evolution of carbon dioxide occurs. In 1 hour and 10 minutes all of the substance has been introduced. Then the mass is further heated under steady stirring for 2 hours and 40 minutes at 60–65° C., whereafter the evolution of $CO_2$ is terminated and stirring is continued for a further 15 minutes at 65° C.

The reaction product is treated according to Example 1. There are obtained 17 gr. of unreacted hexahydrobenzoic acid and 21.45 gr. of crude caprolactam, which, taking into account the acid recovered, corresponds to a lactam yield of 90% of the theoretical amount.

Example 6

A mixture of 27.34 gr. of nitrosyl sulphuric acid, 17.66 gr. of concentrated (100%) sulphuric acid and 35 gr. of oleum with 60% of $SO_3$, is heated for 1 hour to 125–130° C. under stirring.

Into this mixture, cooled, are introduced under stirring and at room temperature 67 gr. of a reaction product coming from a previous charge, which already contains 10.35 gr. of caprolactam and 6.4 gr. of unreacted hexahydrobenzoic acid. The entire mixture is introduced while stirring in an equipment like that of Example 1, into 33 gr. of fresh hexahydrobenzoic acid, heated to 55–60° C. The molar ratio between hexahydrobenzoic acid and nitrosylsulphate is 1.43:1. An evolution of carbon dioxide occurs. As soon as the evolution of carbon dioxide has ceased, heating of the mixture is continued at 60–65° C. in such a way as to render said evolution lively once again. In 1 hour and 15 minutes the whole mass has been introduced. The temperature remains by itself at 60–63° C. for a further 10 minutes. By continued heating the mixture is made to keep for a further 30 minutes the temperature of 60–65° C. and is made finally to rise to 70° C. for a further 5 minutes. No evolution of $CO_2$ is observed any longer and in the mixture no presence of NO ions is noted any longer.

The reaction mixture, being cooled down, is treated as in Example 1. From it 14.8 gr. of hexahydrobenzoic acid are recovered and 28.5 gr. of caprolactam, M.P. 60–64° C., are obtained.

Taking into account the amounts of caprolactam and of hexahydrobenzoic acid already in the starting material as well as the amount of acid recovered, the yield of caprolactam is calculated to be 83.6% of the theoretical amount.

Example 7

Into a 500 cc. flask equipped with a stirrer, a thermometer, a refluxing condenser and a dripping funnel, there are charged 117 gr. of hexahydrobenzoic acid and 80 gr. of cyclohexane. The mass is heated to 78° C. and at that time there is dripped into the mass a mixture formed of 72 gr. of $NO.HSO_4$, 62 gr. of concentrated (100%) sulphuric acid, and 82.2 gr. of oleum with 23% of $SO_3$, previously heated for 1 hour at 130° C. under stirring and then allowed to cool down. The molar ratio between hexahydrobenzoic acid and nitrosyl sulphuric acid is 1.6:1. The addition of the mixture to the hexahydrobenzoic acid is so adjusted as to have a continuous and regular evolution of $CO_2$ and to cause the temperature reaction to remain by itself at 74–75° C. After 40 minutes, the addition of the mixture is terminated. The reaction remains exothermic by itself for 10 minutes; then heating is effected for a further 10 minutes at 74° C. until complete evolution of the $CO_2$.

The product is allowed to cool down, dissolved in cold water, the cyclohexane is separated and treatment is carried out as in Example 1.

45.9 gr. of caprolactam are obtained and 57 gr. of hexahydrobenzoic acid are recovered, of which 49.7 gr. is a residue of the evaporation of the cyclohexane. Taking into account the amount of hexahydrobenzoic acid recovered, the caprolactam yield is 86.5% of the theoretical amount.

Example 8

A 100 cc. flask equipped with stirrer, thermometer and gas intake and exhaust pipes is charged with a mixture, previously prepared in an externally cooled vessel, made of 19.2 of hexahydrobenzoic acid and 51.4 gr. of 23% oleum. In the mixture, kept under constant stirring, a slow stream of 4.5 gr. of nitrosyl chloride are introduced at 40° C. The nitrosyl chloride has been prepared beforehand and purified according to the method disclosed in Inorg. Synth., vol. I, 55, and has been collected by condensation. An exothermic reaction takes place immediately and this is controlled with an intermittent external cooling, in such a way that the temperature may rise to 63° C. within 35 minutes. During all this time an energetic evolution of carbon dioxide has been observed. The mixture is cooled from time to time so that the temperature of the contents of the flask may rise only to a small extent during the subsequent 15 minutes and up to 65° C.

Once this temperature has been attained, the reaction is over, and the mixture is allowed to cool spontaneously, under constant stirring, to room temperature.

The reaction mixture is treated as in Example 1. 8.6 gr. of caprolactam (M.P. 63–66° C.) are obtained, and 5.34 gr. of hexahydrobenzoic acid (besides 1 gr. of a nitrogenous product) are recovered. Taking into account the acid recovered, the caprolactam yield is calculated as 70.3% of the theoretical amount.

Example 9

The $N_2O_3$ used in this example can be prepared by dripping a 67% aqueous solution of $NaNO_2$ in $H_2SO_4$, at a temperature of 50° C. The resultant $N_2O_3$ is entrained by a nitrogen stream. The quantity of $N_2O_3$ is determined by the following test.

A slow stream of the mixture of $N_2O_3$ and nitrogen is introduced in the course of 5 minutes in a 30% aqueous solution of caustic soda which has been well cooled. The solution formed is titrated by the iodometric method and it is found that 0.69 gram of $N_2O_3$ have been introduced. The gas stream, kept at a rigorously constant rate of flow, is introduced at 45° C., with stirring, into a mixture of 19.2 gr. of hexahydrobenzoic acd and 51.4 gr. of 23% oleum, prepared applying external cooling.

The exothermic reaction, which starts immediately, is controlled by external cooling in such a way that the temperature of the mixture rises in the course of 25 minutes to not above 55° C. At this stage the introduction of gas is discontinued, when the content of $N_2O_3$ of the reaction mass—calculated on the basis of the aforementioned test—is of about 3.5 gr. Cooling is discontinued and the mixture is intermittently and cautiously heated so as to cause its temperature to rise to 63° C. during 30 minutes. Once heating has been cut off, the temperature still rises slightly, up to 65° C. The reaction has thus been completed and the evolution of carbon dioxide, which was energetic as long as the reaction went on, is attenuated until it completely disappears. Stirring is continued until the mass has reached room temperature, after which the mass is poured on ice.

The reaction mixture is treated as in Example 1. 6.65 gr. of caprolactam (M.P. 60–65% C.) are obtained, and 7.6 gr. of hexahydrobenzoic acid (besides 0.6 gr. of nitrogenous products), are recovered. Taking into account the acid recovered, the caprolactam yield is calculated as 64.1% of the theoretical amount.

Example 10

In a flask, fitted with stirrer, thermometer and dipping tube for the introduction of gas, a mixture of 19.2 of hexahydrobenzoic acid and 58.8 gr. of 23% oleum is prepared, while externally cooling said flask. The apparatus is connected with an apparatus for the production of ethyl nitrite which is prepared according to Org. Synth., Coll. vol. II, 204–205, by dipping an aqueous alcoholic solution of 17.6% sulphuric acid into an excess of 24.8% sodium nitrite.

The apparatus is previously washed with a stream of ethyl nitrite until the air has been totally displaced, after which the apparatus is connected with the reaction flask into which 5.25 gr. of $C_2H_5ONO$, obtained by adding 20 cc. of the $H_2SO_4$ solution to the $NaNO_2$ solution, are introduced as a slow stream.

An exothermic reaction takes place immediately and the temperature of the mixture rises to 62° C. during a period of 25 minutes. Stirring is continued for a further 25 minutes, during which the mixture is allowed to cool spontaneously to room temperature and the evolution of carbon dioxide, which initially was energetic, is attenuated until it totally disappears. The mixture is then treated as described in Example 1. 2.5 gr. of caprolactam (M.P. 60–65° C.) are obtained and 103 gr. of unreacted hexahydrobenzoic acid are recovered. (A portion of this acid has been recovered from the ether in the form of ethyl hexahydrobenzoate.)

On taking into account the hexahydrobenzoic acid recovered, the caprolactam yield is calculated at 31.8% of the theoretical amount.

*Example 11*

40.4 gr. of hexahydrobenzoic acid are mixed, while stirring, with 36.4 gr. of 95% sulphuric acid (viz. acid containing 95% of $H_2SO_4$) and to this mixture, heated to 120° C. and stirred, a mixture of 36.6 gr. of nitrosyl sulphuric acid and 34 gr. of sulphuric acid of the same concentration as above are added dropwise under stirring.

After about one-fourth of the nitrosylic mixture has been added, the temperature rises to 127–130° C. since the reaction is exothermic. The temperature is kept within this range by suitably adjusting the introduction of the nitrosylic mixture and, if necessary, by heating or cooling the mass from outside, as the case may be. From the mass, carbon dioxide is continually evolved throughout the reaction.

The reaction product is cooled under stirring and is then poured on ice and treated as in Example 1. 11.2 gr. of caprolactam are obtained and 20.9 gr. of hexahydrobenzoic acid are recovered. Taking into account the acid recovered, the caprolactam yield is calculated as 65% of the theoretical amount.

*Example 12*

The apparatus of Example 1, is adopted for this experiment. The flask is charged with 55.2 gr. of 23% oleum. 16.0 gr. of the sodium salt of hexahydrobenzoic acid are gradually added under continuous stirring and cooling so as to maintain the temperature between 20° C. and 30° C.

The reaction mass is heated to 65° C. and the addition of 20.5 gr. of a solution of 11.0 gr. of nitrosyl sulphuric acid in 9.5 gr. of concentrated (100%) sulphuric acid, is slowly begun. An exothermic reaction takes place and, as the nitrosyl sulphate is added dropwise, the temperature rises to 75° C. At the beginning of the exothermic reaction and throughout its duration there is an energetic evolution of $CO_2$. Once the addition is terminated, the reaction mass is maintained at 75° C. for 5 minutes after which it is poured on ice and treated as described in Example 1.

7.71 gr. of caprolactam are obtained, together with traces of by-products and 3.4 gr. of recovered hexahydrobenzoic acid. Taking into account the hexahydrobenzoic acid recovered, the caprolactam yield is 85.2% of the theoretical amount.

By working in the same manner with 17.6 gr. of potassium salt of hexahydrobenzoic acid, 7.1 gr. of caprolactam are obtained. Traces of by-products are recovered along with 3.8 gr. of hexahydrobenzoic acid. The caprolactam yield, taking into account the hexahydrobenzoic acid recovered, is 82.0% of the theoretical amount.

*Example 13*

91.9 gr. of hexahydrobenzoic acid are mixed, with stirring and with a slight external heating, in the course of 10 minutes, with a mixture of 18.2 gr. of nitrosyl sulphate and 15.6 gr. of 100 sulphuric acid, so as to maintain the temperature of the mass at 30–35° C. 21.9 gr. of oleum at a concentration of 60% of $SO_3$ are added to the mixture under continuous stirring and during 20 minutes, while maintaining the temperature at 30–35° C. by means of external cooling. The molar ratio of hexahydrobenzoic acid to nitrosyl sulphate is 5:1. The mass is heated so that its temperature gradually rises and reaches 110° C. during one hour.

During this time a continuous evolution of carbon dioxide is observed. The mass is allowed to cool, under stirring, to room temperature and is then treated as in Example 1.

3.0 gr. of caprolactam (M.P. 60–62° C.) are obtained and 86.2 gr. of unreacted hexahydrobenzoic acid are recovered.

Taking into account the starting material recovered, the caprolactam yield is calculated as 59.4% of the theoretical amount.

When ketones are used, these have the general formula:

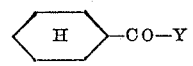

where Y is an aromatic, aliphatic, alicyclic or mixed radical. The nitrosation reaction takes place above −20° C.: in the presence of oleum preferably between −15° C. and +45° C., and with concentrated sulphuric acid at higher temperatures, up to 150° C. The reaction products obtained in addition to unreacted ketone and to caprolactam depend on the character of the "Y" radical and on the reaction conditions. Examples are benzoic acid, nitrobenzoic acid, sulfonated naphthoic acid. The preferred range of molar ratios between ketone and nitrosation agent is about the same as in the case of hexahydrobenzoic acid.

*Example 14*

15 gr. of cyclohexyl-phenyl ketone, M.P. 55° C., are added gradually during one hour's time to 42.6 gr. of oleum with a 23% $SO_3$ content under stirring and under such cooling as not to exceed the temperature of 30–35° C. Subsequently 3.7 gr. of dry sodium nitrite are added to the mixture, again under steady stirring and gradually in the course of one further hour, the temperature being maintained at about 38–40° C. When everything has dissolved, the solution is poured onto ice. The mixture thus obtained is extracted three times with about 50 cc. of ether. By uniting the ether extracts separated from water, an ether solution and an aqueous solution are separately obtained.

By extracting the ether solution with 75 cc. of 10% sodium carbonate solution and by acidifying the aqueous solution containing the carbonate with hydrochloric acid, 5.65 gr. of crude benzoic acid are obtained which, on being recrystallized and dried, yield 5.1 gr. of pure benzoic acid, M.P. 120–122° C. The remaining ether is dried and evaporated. A residue of 7.5 gr. of material is obtained thereby from which—after eliminating oily impurities formed—6.5 gr. of unreacted cyclohexyl-phenyl ketone, M.P. 50–55° C., are obtained. The original aqueous solution as obtained by separation from the above mentioned ether extracts, is completely neutralised by the addition firstly of 58 cc. of a 40% sodium hydroxide solution and then of some droplets of a 10% sodium carbonate solution, and is then extracted six times with about 20 cc. of chloroform each time. From the chloroform extracts collected and dried, there are obtained—after eliminating the solvent—4.7 gr. of caprolactam, M.P. 65–69° C. Taking into account the recovered ketone, the yield of lactam is 87.3% of the theoretical amount while the yield of benzoic acid is 88%.

If the reaction is conducted as described above, using 15 gr. of cyclohexyl-phenyl ketone and 3.7 gr. of sodium nitrite, but only 18.6 gr. of oleum (23% $SO_3$) the quantity of water evolved throughout the reaction:

$$NaNO_2 + 2H_2SO_4 = NaHSO_4 + NO.O.SO_3H + H_2O$$

corresponds to the quantity of $SO_3$ present in the mixture, so that no free $SO_3$ is present.

At a maximum temperature of 50° C., 5.87 gr. of benzoic acid and 4.65 gr. of caprolactam are obtained in this case and 3.9 gr. of unreacted ketone are recovered.

Taking into account the recovered ketone, the benzoic acid yield is 81.5% of the theoretical amount and the caprolactam yield is 69.8%.

*Example 15*

10 gr. of cyclohexyl-phenyl ketone are added to 28 gr. of oleum with a 23% $SO_3$ content, while stirring, in the course of one hour while the temperature is kept at 30–35° C. by cooling.

Non-dried nitrogen monoxide NO is passed into the solution for 2.5 hours, while the temperature is kept at about 0° C. by cooling. The increase of weight of the solution is 1.6 gr.

The product thus obtained is left at room temperature for one night and is then poured into ice water.

Further treatment of the product of reaction takes place in the same manner as in Example 14. In that way 4.5 gr. of starting material are recovered and, moreover, 3 gr. of benzoic acid (M.P. 121–123° C.) and 2.75 gr. of caprolactam (M.P. 66–68° C.) are obtained. The yields, taking into account the starting material recovered, are 83.4% of the theoretical amount of caprolactam and 84% of benzoic acid.

*Example 16*

The preparation of the nitrosyl sulphate solution used as a nitrosation agent in this example, will be described first.

About 90 gr. of 100% nitric acid and 4 gr. of a 50% nitrosyl sulphate solution in oleum having a 23% $SO_3$ content obtained from a previous preparation, are introduced into a 250 cc. flask placed in a refrigerating mixture and equipped with a stirrer, a thermometer, a funnel with a cock and a gas inlet pipe. The mixture is stirred until it has acquired the temperature of —5° C. and sulfur dioxide is bubbled therethrough at such a speed that the temperature does not rise above 0° C. When 45 gr. (about 50% by weight of the amount needed in theory) have been absorbed, the mass begins to thicken and to separate crystals. Then a further 18.7 gr. of oleum with 23% of $SO_3$ are added and the introduction of sulfur dioxide is continued until a total of 80 gr. of sulfur dioxide has been absorbed. The mass is further diluted with 25.3 gr. of oleum with 60% of $SO_3$ and more sulfur dioxide is introduced until a total of 85.2 gr. of the latter has been absorbed, which corresponds to about 93.5% of the theoretical amount. After a further addition of 10.5 gr. of oleum with 60% of $SO_3$, no further amount of sulfur dioxide is absorbed. The mass is now partly solid and crystalline. It is diluted with 21 gr. of oleum with 23% of $SO_3$ and heated for one hour at 40° C. in a water bath, whereby 250 gr. of a solution of nitrosyl sulphate in oleum are obtained, containing about 65% of nitrosyl sulphate and 2.7% of free nitric acid. The content of nitrosyl sulphate and of free nitric acid is determined by titrating with N/10 $KMnO_4$ and by determining the total nitrogen according to Devarda. In this case the difference between the two determinations is 2.7%, which corresponds to the free nitric acid present in the mixture. 20 gr. of cyclohexyl-phenyl ketone are now added to 18.8 gr. of oleum with 23% of $SO_3$ in the course of 30 minutes, the temperature being kept at 15–17° C. Into the mixture, cooled to 0° C., 20.8 gr. of a solution of nitrosyl sulphate in oleum containing 13.5 gr. of nitrosyl sulphate and 2.7% of free nitric acid, prepared as set forth above, are bubbled in the course of 3 hours while stirring, and while adjusting the addition of the reactants in such a way that the temperature does not rise above 5° C. The mixture is stirred for 3 hours at the same temperature, then the temperature is raised steadily under stirring in the course of 10 hours gradually to 40° C. and finally stirring is continued for 30 minutes at 40° C. The reaction product is treated as in Example 14 to separate the components. 2.5 gr. of unreacted ketone, 10.5 gr. of benzoic acid (M.P. 120–121° C.) and 9.5 gr. of caprolactam are obtained. Taking into account the ketone recovered, the yield of caprolactam is 90.5% and the yield of benzoic acid is 92.5% of the theoretical amount.

*Example 17*

A solution of nitrosyl sulfate in oleum is prepared as described in Example 16, from 22.1 gr. of 100% nitric acid, 12 gr. of oleum with 23% of $SO_3$ and 10.2 gr. of sulfur dioxide. The indicated amount of sulfur dioxide reacts only with about 45.5% of the nitric acid present to form nitrosyl sulphate, so that the mixture still contains free nitric acid.

10 gr. of cyclohexyl-phenyl ketone are now added under stirring to 28 gr. of oleum with 23% of $SO_3$ in such a way that the temperature does not rise above 10–15° C. The solution is cooled to —5° C. and 14.8 gr. of the solution of nitrosyl sulphate are added in the course of 3 hours, while the temperature is prevented from rising above —3° C. The mass is stirred at that temperature for one hour, the mixture is allowed gradually to assume the room temperature in the course of two hours, then in one hour it is brought to 35° C. by cautious heating and finally it is poured onto ice.

Treating the reaction product as in Example 14, 1.5 gr. of unreacted impure ketone, 5.1 gr. of meta-nitrobenzoic acid (M.P. 135–137° C.) and 3.9 gr. of caprolactam (M.P. 64–68° C.) are obtained. The presence of nitrobenzoic acid is due to the fact that in the solution of nitrosyl sulphate in oleum, free nitric acid is present. Since in this case 1.5 gr. of impure ketone, partly nitrated, have been recovered, the computation of the yields can only be approximative. The 1.5 gr. of impure ketone correspond to about 1 gr. of pure ketone, so that if the amount recovered is so evaluated, the yield of caprolactam appears to be of the theoretical amount.

*Example 18*

Cyclohexyl-naphthyl ketone is prepared by the known method (Friedel-Crafts) from naphthalene, hexahydrobenzoyl chloride and 1.1 mols of aluminium trichloride per each mol of hexahydro-benzoyl chloride, in nitrobenzene as a solvent. The finished product has a boiling point of 177.5–178° C. under a pressure of 0.1 mm. Hg and contains, according to the analysis, 92.5% of ketone. 8 gr. of that product are dripped in 15 minutes into 10 cc. (=19.5 gr.) of oleum (with a 23% $SO_3$ content), and the whole is stirred and cooled to a temperature of —5° C. While the mixture is kept at a temperature of 0° C. by external cooling, 6.5 gr. of a mixture containing 3.8 gr. of nitrosyl sulphate (96% of the theoretical amount as calculated from the analysis of the ketone group) and 2.7 gr. of oleum with 23% of $SO_3$ are introduced in 30 minutes. The reaction mass is then kept at +5° C. for 5 hours and 15 minutes. The temperature is allowed to rise to room temperature (20–25° C.) in the course of 4 hours then is brought to 30° C. in the course of 45 minutes by external heating and is kept at that temperature for 1 hour and 10 minutes. Then the mass is poured onto ice. To eliminate the impurities from the mass, the latter is extracted 4 times with 50 cc. of ether. On evaporation of ether, a residue of 0.4 gr. is obtained. Sulphonated napththoic acid which is very soluble in water remains in the acid liquors. The acid liquors are brought to pH=7.5 with 40% NaOH, keeping the temperature at 30–35° C. during neutralization, and they are repeatedly extracted with chloroform. After evaporation of the solvent, 3.4 gr. of crude caprolactam, M.P. 63–69° C., are obtained. The yield referred to the ketone employed is 82.4% of the theoretical amount.

Example 19

A 100 cc. flask, equipped with stirrer, dripping funnel, thermometer reaching the bottom and gas intake and exhaust pipes, is used as the reaction vessel. The reflux condenser is cooled by brine having a temperature of −17° C. to −18° C. and is insulated with asbestos. The flask contains 15.4 gr. of cyclohexyl-phenyl ketone and the funnel contains a mixture of 9.35 gr. of purified nitrosyl sulphate (prepared according to Inorg. Synth., vol. I, page 55), 10.85 gr. of 100% sulphuric acid and 7.56 gr. of 60% oleum (molar ratio of ketone to nitrosyl sulphate, 1.11 to 1).

Under continuous stirring, 6 gr. of liquid ethyl chloride are introduced into the flask: the contents of the flask attains, within a few minutes, with the cooling liquid in countercurrent flow, the temperature of +12° C. By external cooling, the temperature of the contents of the flask is caused to drop again to +2° C., after which the nitrosylic mixture in the funnel is added dropwise to the contents of the flask kept under continuous stirring so that the temperature, which immediately rises due to the exothermic reaction, does not exceed 10° C.: this takes 25 minutes.

Once the external cooling is discontinued, a slight amount of gaseous ethyl chloride is discharged from the flask until a temperature between 20 and 30° C. is established: this temperature range is maintained for 1 hour and 50 minutes by adding or discharging ethyl chloride. On discharging ethyl chloride again, the temperature rises to 35° C., and is maintained to this level by the same method for a further 2 hours and 50 minutes, after which the reaction is completed. The pale yellow clear solution resulting from the reaction (44 grams) is poured on twice its weight of ice and treated as in Example 1. After extraction with ether and separation of the two layers, 8.6 gr. of caprolactam, of a clear colour, M.P. 67–68° C., are obtained from the aqueous layer on extracting with chloroform and evaporating. From the ether extract, after extraction with a 10% solution of sodium carbonate and acidification of this latter, 9.3 gr. of benzoic acid (M.P. 117–120° C.) are obtained and, from the same ether, after drying and evaporation, a further 0.7 gr. of residue, containing 0.58 of unreacted substance, are recovered.

Taking into account this recovered substance, the caprolactam yield is 96.6% of the theoretical amount and the yield of benzoic acid is 96.7%.

Example 20

The same apparatus used in Example 19, but with a 250 cc. flask is used. The flask contains 30.8 gr. of cyclohexyl-phenyl ketone, and the drip funnel contains a mixture of 18.7 gr. of nitrosyl sulphate, 21.7 gr. of concentrated (100%) sulphuric acid and 15.12 gr. of 60% oleum (molar ratio of ketone to nitrosyl sulphate 1.11 to 1). Liquid dischlorotetrafluoroethane (Freon 114), B.P. 3.5° C., is introduced first into the flask under stirring. It becomes mixed with the ketone forming a homogeneous liquid phase. After the introduction of 11 gr. of dichlorotetrafluoroethane, the contents of the flask attains a temperature of +3° C. The nitrosylic mixture is then added by drops in the course of 20 minutes and the temperature rises to +10° C. A slight amount of gaseous dichlorotetrafluoroethane is discharged from the apparatus, so as to establish a temperature of +15° C. which is maintained for a period of 2 hours and 20 minutes by adding or discharging more of the same. In the same way the temperature is raised to 25° C. and then, during 1 hour, to 35° C. At this temperature the reaction goes to completion in a further 4 hours and 40′. By treating the yellowish and clear reaction product as in Example 19, 1.48 gr. of unreacted ketone are recovered, and 16.85 gr. or of almost white caprolactam (M.P. 66.5—67° C.), together with 18.8 gr. of benzoic acid are obtained. Taking into account the starting substance recovered, this corresponds to a caprolactam yield of 95.6% and to a benzoic acid yield of 99.1%, of the theoretical amount.

Example 21

The apparatus used in Example 19 is connected to a source vacuum controlled by a pressostat. The drip funnel ends in a capillary tube.

After the reagents have been introduced into the apparatus in the quantities indicated in Example 19 and 15 gr. of cyclohexane (B.P. at 760 mm. Hg=81° C.) have been added to the ketone in the flask, the pressure is brought to 45—47 mm. Hg, at which pressure the cyclohexane boils at +10° C. The homogeneous mixture is stirred and being cooled by the condensing cyclohexane, reaches after a few minutes the temperature of +10° C.: the nitrosylic mixture is added dropwise to the contents of the flask by means of the capillary tube of the drip funnel so that the temperature and the pressure are kept constant. The cooler is filled with running water, the pressure is raised to 110–120 mm. Hg (B.P. of cyclohexane 25–30° C.) and is kept constant for two hours, under constant stirring.

After this, the pressure in the apparatus is brought to 180–185 mm. Hg (B.P. of cyclohexane 40° C.) whereas the temperature of the cooling water is brought to about +30° C.; the mixture is stirred for 4 hours under these conditions, after which the reaction is completed. The treatment of the clear, pale-coloured reaction mixture is effected as in Example 19 and gives the same yields of benzoic acid and very pure caprolactam (M.P. 66–66.5° C.).

Example 22

The apparatus of Example 20 equipped with a reflux condenser slightly longer than usual (1 meter) is used. The flask contains 30 grams of cyclohexyl-phenyl ketone, and a mixture of 18.3 gr. of purified nitrosyl sulphate (free of nitric acid and nitrogen oxides), 16.5 gr. of concentrated sulphuric acid and 19.8 gr. of 23% oleum is introduced into it (molar ratio of ketone to nitrosyl sulphate 1.1:1). Sulphur dioxide is introduced into the externally cooled flask until 10 cc.=14 gr. of it have condensed, after which the nitrosylic mixture is added dropwise and under continuous stirring in the course of 20 minutes to the contents of the flask, so as to establish a temperature comprised between +6° C. and +10° C. and the external cooling is discontinued.

By cautiously discharging gaseous $SO_2$, the temperature is brought to 25° C. during one hour, then, by using the same method, from 25° C. to 30° C. within one-half hour and finally, in a further half-hour, from 30° C. to 35–40° C. The reaction mixture, which is clear and only slightly coloured, is poured, with stirring, on 100 grams of finely crushed ice and is treated as described in Example 19.

2 gr. of unreacted ketone are recovered and 17.4 gr. of benzoic acid (M.P. 121–122° C.) together with 16.2 gr. of yellow caprolactam are obtained so that, on taking into account the ketone recovered, a 96% yield of benzoic acid, and a 96% yield of the lactam, are obtained.

Example 23

The apparatus used is that of Example 22. The flask contains 16.0 gr. of cyclohexyl-para-toluic ketone, having the formula (J. Am. Chem. Soc. 72 (1950), 1655):

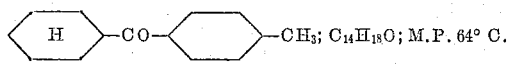

In the drip funnel there are introduced 9.12 gr. of nitrosyl sulphate, dissolved in a mixture of 9.9 gr. of 23% oleum and 8.28 gr. of concentrated (100%) sulphuric acid. (Molar ratio of ketone to nitrosyl sulphate 1.11 to 1.)

10 to 12 gr. of $SO_2$ (=8 cc.) are condensed in the externally cooled flask, the mixture is stirred and the nitrosylic mixture is introduced in the course of 15 minutes, while the temperature is kept between $-4°$ C. and $+5°$ C. After discontinuing the external cooling, the temperature is raised in the course of 45 minutes from 5° C. to 25° C., while gas is cautiously discharged; then the temperature is maintained at about 25–30° C. for 2 hours and 30 minutes, and finally is raised for one hour to 35° C. after which the reaction is completed by bringing the temperature of the contents of the flask to 40° C. for two and a half hours.

Operating as in Example 19, 1.0 gr. of unreacted ketone is recovered and 9.7 gr. of para-toluic acid, M.P. 175–178° C. (the literature reports 179–180° C.), together with 8.2 gr. of slightly yellow caprolactam (M.P. 66.5–67° C.) are obtained. Taking into account the starting substance recovered, the yield of lactam is calculated as 97.2% and that of toluic acid as 96.5% of the theoretical amount.

Example 24

Hexahydrobenzoyl chloride and cumene are condensed by the known process with aluminum chloride and the fraction of the condensation product which distils at 123° C. under a pressure of 0.2 mm. Hg is utilized. The structural formula of the formed ketone cannot be precisely defined, since the ketone is probably constituted by a mixture of isomers. A possible structural formula is

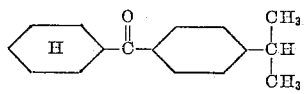

The flask is charged with 20.4 gr. of the condensation product and the drip funnel is charged with a solution of 9.12 gr. of purified nitrosyl sulphate in a mixture of 8.82 gr. of concentrated sulphuric acid and 9.9 gr. of 23% oleum.

In an externally cooled flask 3 cc. (=4.2 gr.) of sulphur dioxide are condensed, after which the temperature of the contents of the flask is caused to drop to $+5°$ C. and the nitrosylic mixture is added in dropwise in the course of 1 hour and 40 minutes, so that the temperature rises to $+11°$ C.

The external cooling is discontinued and the temperature is caused to rise, in the manner described, to 35° C. in the course of 1 hour and 30 minutes, and then to 38° C. in the course of a further 2 hours. The reaction mixture, treated as in Example 19, yields 8.5 gr. of pale-coloured caprolactam having a M.P. of 66–67° C., 2.3 gr. of unreacted starting material and 12.3 gr. of an impure monocarboxylic acid from which, by distilling at 120–125° C. under a pressure of 0.2 mm. Hg, there are obtained 8.2 gr. of a purer monocarboxylic acid having an M.P. of 63–67° C. and an acid number of 310.8 (the acid number of cuminic acid is 341.5). Assuming that the starting substance—corresponding to the brute formula of the ketone $C_{16}H_{22}O$—has a molecular weight of 230, the yield of caprolactam, taking into account the amount recovered, is calculated as 95.6% of the theoretical amount.

Example 25

Hexahydrobenzoyl chloride and meta-xylene are condensed in the usual way with aluminum chloride and the fraction of the condensation product formed which distils at 128–129° C. under a pressure of 0.3 mm. Hg is utilized.

In this case too it is not possible precisely to define the structural formula of the ketone. A possible formula is:

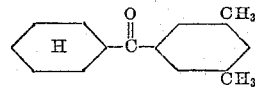

In the flask, in which 18.5 gr. of condensate have been introduced, 6 gr. of sulphur dioxide are condensed in the way already described and a mixture of 8.72 gr. of purified nitrosyl sulphate, 10.13 gr. of concentrated (100%) sulphuric acid and 7.07 gr. of 60% oleum are introduced in the course of 15 minutes. The temperature is caused to rise, in the manner already described, to 30° C. in the course of 2 hours and 30 minutes and to 38° C. in the course of a further four and a half hours.

The reaction mixture, treated as in Example 19, yields 7.1 gr. of caprolactam (M.P. 66–66.5° C.), 3.5 gr. of unreacted starting material, and 9.5 gr. of a monocarboxylic acid which, in view of its melting point of 118–120° C. and its acid number of 378.00 is probably 2,6-dimethylbenzoic acid (the acid number of 2.6-dimethylbenzoic acid is 373.33, its M.P. is 116° C., cfr. Beilstein X, 531).

Attributing to the starting substance a molecular weight of 216—corresponding to the brute formula $C_{15}H_{20}O$— the caprolactam yield, taking into account the quantity recovered, is calculated as 90.5% of the theoretical amount.

Example 26

A 100 cc. flask, equipped with stirrer, thermometer and intake and outlet tubes for gas, is charged with 18.8 gr. (0.1 mol) of cyclohexyl-phenyl ketone dissolved in 34.2 gr. of 23% oleum. The solution kept under constant stirring, is initially externally cooled to $+8°$ C. and a stream of dry nitrosyl chloride (prepared for example as described in Inorg. Synth., IV, 48) is introduced into the cooled solution for about 5 minutes, until the weight of the flask has been increased by 5.8 grams. An exothermic reaction starts immediately. The temperature of the reaction mixture is controlled by external cooling so that it rises from 10° C. to 30° C. in 75 minutes. Then the temperature of the mixture is raised to 35° C. and is maintained at this level for 45 minutes. Thus the reaction is completed. After discontinuing the cooling, the contents of the flask is heated again to 38° C. for 15 minutes and— after having allowed it to cool to room temperature—it is poured on twice its weight of ice and treated as in Example 19.

7.9 gr. of unreacted ketone are recovered, and 5.6 gr. of caprolactam (M.P. 61–67° C.) and 5.8 gr. of benzoic acid are obtained. Taking into account the ketone recovered, the caprolactam yield is calculated as 85.5% and the benzoic acid yield as 82% of the theoretical amount.

Example 27

The apparatus of Example 26 is used. The flask contains 18.8 gr. of cyclohexyl-phenyl ketone (0.1 mol) dissolved in 34.2 gr. of 23% oleum. Into the mixture, kept under continuous stirring and brought to $+8°$ C. by external cooling, a gaseous mixture, mainly composed of nitrogen trioxide ($N_2O_3$) (prepared from $NaNO_2$ and $H_2SO_4$), is introduced for 50 minutes employing a nitrogen stream as the carrier, until the reaction mass has increased its weight to 2.5 gr. (83.3% of the theoretical amount).

The exothermic reaction which rapidly initiates is maintained under control by continually stirring and cooling the mixture so that after one hour and 45 minutes its temperature has risen to 30° C. In another 45 minutes the temperature is raised little by little to 35° C., after which the reaction is completed. The cooling is discontinued and the mixture is brought by external heating to 38° C. and is kept at this temperature for 15 minutes. The mass is allowed to cool to room temperature, poured on ice, and treated as in Example 19.

7.2 gr. of caprolactum (M.P. 62–65° C.), 7.75 gr. of benzoic acid (M.P. 120–122° C.) and 4.8 gr. of unreacted starting substance are obtained.

Taking into account the ketone recovered, the caprolactam yield is calculated as 85.5% and the benzoic acid yield as 85.2% of the theoretical amount.

*Example 28*

5.2 gr. of ethyl nitrite (prepared according to Org. Synth., X, 22), equal to about 70% of the quantity of $C_2H_5O.NO$ theoretically necessary, are introduced into 18.8 gr. of cyclohexyl-phenyl ketone (0.1 mol) dissolved in 39.2 gr. of 23% oleum in the course of one hour, stirring and cooling the mass to 8° C.–10° C.

The exothermic reaction which develops immediately is controlled with the cooling bath so that the temperature of the reaction mixture rises in one hour and 15 minutes to 30° C.

In a further 20 minutes the temperature is raised to 35° C. after which the reaction is ended. The reaction mixture is heated again for 20 minutes at 38° C., is allowed spontaneously to cool at room temperature, is poured on ice, and treated as in Example 19. 6.1 gr. of caprolactam (M.P. 60–64° C.) and 6.5 gr. of benzoic acid are obtained and 6.5 gr. of starting substance are recovered.

Taking into account the cyclohexyl-phenyl ketone recovered, the caprolactam yield is calculated as 82.5% and the benzoic acid yield as 81.4% of the theoretical amount.

*Example 29*

11.3 gr. of cyclohexyl-phenyl ketone are dissolved while stirring in 13.7 gr. of 95% sulphuric acid.

A mixture of 6.35 gr. of nitrosyl sulphuric acid and 6 gr. of 95% sulphuric acid is slowly added by drops to the solution heated to 100° C. (molar ratio of the ketone to nitrosyl sulphuric acid=1.2:1).

An exothermic reaction immediately initiates and the temperature rises to 115° C. As soon as this temperature is reached, the introduction of the nitrosylic mixture is regulated so that the temperature of the mixture is kept at about 115° C. In 20 minutes all the mixture has been added.

The reaction mixture is allowed to cool under stirring, is poured on ice, and is treated as in Example 19.

The products obtained are 5.8 gr. of benzoic acid, 4.7 gr. of caprolactam and 1.5 gr. of unreacted ketone. Taking into account the ketone recovered the benzoic acid yield is calculated as 91.2% and the caprolactam yield as 79.8% of the theoretical amount.

Other examples with other starting compounds are the following.

*Example 30*

The apparatus used in this example comprises a round 100 cc. flask equipped with a thermometer dipping to the bottom, a drip funnel and a reflux condenser through the jacket of which is circulated brine at −17° C. to −18° C. In the flask there are 33.6 gr. (=0.2 mol) of trimethylacetyl cyclohexane (omega-omega'-omega''-trimethylhexahydro-acetophenone), to which 10 gr. of liquid ethyl chloride are added. The contents of the flask steadily stirred attain in a few minutes, as the ethyl chloride is refluxed, a temperature of +12° C. By cooling from the outside the temperature of the contents is lowered again to +7° C. and the nitrosation mixture which is in the drip funnel and consists of 22.85 gr. of purified nitrosyl sulphuric acid, 25 gr. of concentrated sulphuric acid and 25 gr. of 60% oleum is introduced (molecular ratio of ketone to nitrosyl sulphuric acid 1.11:1), while the temperature of the contents of the flask does not exceed +10° C.

After removal of the external cooling, some gaseous ethyl chloride is allowed to escape until a temperature of 25° C. is established, which is maintained for two hours by adding or removing ethyl chloride as needed. The temperature is regulated in the same way for a further two hours and a half so that it remains constant at about 35° C.; then the reaction mixture of a clear yellow colour, is treated as follows. It is poured onto ice, extracted with ether and the two layers are separated. The aqueous layer is neutralised, extracted with chloroform and the latter is evaporated. There remain 16 gr. of crude caprolactam.

The other layer is shaken with a 10% solution of sodium carbonate and the two layers are separated. After evaporation of the ether of the ether layer, 2.7 gr. of unreacted ketone are obtained. The liquors which contain the sodium carbonate are acidified (pH=1), cooled thoroughly in ice water and extracted with ether. By evaporating the latter, there remains trimethyl acetic acid, M.P. 35.5° C. Taking into account the starting substance recovered, the yield of caprolactam is 77% of the theoretical amount.

*Example 31*

The starting substance used is omega-omega'-omega''-trifluoroacetyl-cyclohexane

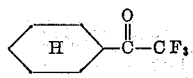

18 gr. (=0.1 mol) of the ketone are introduced into the flask; the nitrosation mixture consists of 11.35 gr. of purified nitrosyl sulphuric acid, 12 gr. of concentrated (100%) sulphuric acid and 12 gr. of 60% oleum are used (molecular ratio of ketone to nitrosyl sulphuric acid 1.12:1). For the remainder, the operation is carried out as in Example 33, in the presence of ethyl chloride and at 35° C. Thereafter the mixture is poured onto ice, extracted with ether, the layers are separated, the aqueous layer is neutralised, extracted with chloroform and the latter is evaporated: 8.33 gr. of caprolactum are obtained (73.7% of the theoretical amount).

*Example 32*

In the apparatus described in Example 30 and with a mixture of 20.31 gr. of purified nitrosyl sulphuric acid, 18.3 gr. of concentrated (100%) sulphuric acid and 22.35 gr. of 23% oleum and in the presence of 5–6 cc. of sulphur dioxide, there are nitrosated, in the course of 40 minutes and while stirring at a temperature of from +8° C. to +10° C., 19.4 gr. (=0.1 mol) of dicyclohexyl ketone (B.P. at 14.5 mm. Hg, 143–144.5° C.), as obtained by dehydrogenating dicyclohexyl carbinol with copper chromite as a catalyst (molecular ratio of ketone to nitrosyl sulphuric acid 1.25:2).

The temperature is adjusted by discharging or adding sulphur dioxide in such a manner that because of the exothermic reaction it rises in the subsequent 50 minutes from 10° C. to 30° C. and in a further 20 minutes from 30° C. to 40° C. By cautious heating the temperature of the mixture is then raised in the course of 35 minutes from 40° C. to 60° C. and it is kept at that level for a further 55 minutes. The mixture is cooled, is poured onto ice and is treated as described in Example 30.

4.3 gr. of ketone are recovered and 16.17 gr. of caprolactum are obtained. The lactam yield calculated on the two cyclohexyl groups of the ketone and taking into account the starting substance recovered, corresponds to 91.9% of the theoretical amount.

We claim:

1. A process for the preparation of caprolactum, which comprises subjecting the starting material in a sulfuric acid reaction medium, the sulfuric acid employed containing at least sufficient $SO_3$ to provide 85% by weight of $H_2SO_4$, to the action of a nitrosating agent which provides NO ions in such sulfuric acid reaction medium, said starting material being cyclohexane which has only one of its hydrogen atoms replaced by a substituent group connected by the carbon atom of a carbonyl group in said substituent group; and continuing the reaction in said sulfuric acid reaction medium until caprolactam is formed and said substituent group is eliminated from the molecule.

2. A process for the preparation of caprolactum, which comprises subjecting the starting material in a fuming sulfuric acid reaction medium to the action of a nitrosating agent which provides NO ions in such sulfuric acid reaction medium, said starting material being cyclohexane which has only one of its hydrogen atoms replaced by a substituent group connected by the carbon atom of a carbonyl group in said substituent group; and continuing the reaction in said sulfuric acid reaction medium until caprolactam is formed and said substituent group is eliminated from the molecule.

3. A process as defined in claim 2 wherein temperatures in the range upward from at least 30° C. to about 200° C. are used during absorption of the NO ions.

4. A process for the preparation of caprolactam, which comprises subjecting hexahydrobenzoic acid in a sulfuric acid reaction medium, the sulfuric acid employed containing at least sufficient $SO_3$ to provide 85% by weight of $H_2SO_4$, to the action of a nitrosating agent which provides NO ions in such sulfuric acid reaction medium; and continuing the reaction in said sulfuric acid reaction medium until caprolactam is formed and the carboxy group is eliminated from the molecule.

5. A process for the preparation of caprolactam, which comprises subjecting hexahydrobenzoic acid starting material, in a fuming sulfuric acid reaction medium, to the action of a nitrosating agent which provides NO ions in such sulfuric acid reaction medium; and continuing the reaction in said sulfuric acid reaction medium until caprolectam is formed and the carboxy group is eliminated from the molecule.

6. Process as defined in claim 5 wherein the nitrosation agent present in the reaction mixture comprises a mixture of nitrosyl sulfuric acid and nitrosyl sulfuric acid anhydride; wherein the total sulfuric acid available from the reaction mixture amounts to at least about 2.5 mols per mol of caprolactam calculated as theoretical yield; wherein the mol ratio of hexahydrobenzoic acid employed: NO contained in the nitrosating agent is between about 3:1 and about 1:1, and wherein temperatures upward from at least 30° C. are used during absorption of the NO ions and temperatures in the range between about 45° C. and about 200° C. are attained during the reaction.

7. A process for the preparation of caprolactam, which comprises subjecting hexahydrobenzoic acid lower alkyl ester starting material, in a fuming sulfuric acid reaction medium, to the action of a nitrosating agent which provides NO ions in such sulfuric acid reaction medium; and continuing the reaction in said sulfuric acid reaction medium until caprolactam is formed and the carbalkoxy group is eliminated from the molecule.

8. A process for the preparation of caprolactam which comprises subjecting cyclohexyl phenyl ketone starting material in a fuming sulfuric acid reaction medium to the action of a nitrosating agent which provides NO ions in such sulfuric acid reaction medium; and continuing the reaction in said sulfuric acid reaction medium until caprolactam is formed and the benzoyl group is eliminated from the molecule.

9. A process for the preparation of caprolactam which comprises subjecting dicyclohexyl ketone starting material in a fuming sulfuric acid reaction medium to the action of a nitrosating agent which provides NO ions in such sulfuric acid reaction medium; and continuing the reaction in said sulfuric acid reaction medium until caprolactam is formed and the carbonyl group is eliminated from the molecule.

References Cited in the file of this patent

FOREIGN PATENTS

| | | |
|---|---|---|
| 545,401 | Canada | Aug. 27, 1957 |
| 781,380 | Great Britain | Aug. 21, 1957 |

UNITED STATES PATENT OFFICE
CERTIFICATION OF CORRECTION

Patent No. 3,022,291            February 20, 1962

Werner Muench et al.

It is hereby certified that error appears in the above numbered patent requiring correction and that the said Letters Patent should read as corrected below.

Column 3, line 22, for "ration" read -- ratio --; column 7, lines 11 and 12, for "125-130% C." read -- 125-130° C. --; same column, line 38, after "already" insert -- present --; column 8, line 41, for "acd" read -- acid --; same column, line 60, for "60-65% C." read -- 60-65° C. --; column 9, line 17, for "103 gr." read -- 10.3 gr. --; same column, line 22, for "at" read -- as --; column 10, line 10, for "100" read -- 100% --; column 17, line 53, for "caprolactum" read -- caprolactam --; column 18, line 13, for "other" read -- ether --; line 37, for "Example 33" read -- Example 30 --; same column, lines 41, 65 and 66, and 71, and column 19, line 9, for "caprolactum", each occurrence, read -- caprolactam --.

Signed and sealed this 11th day of September 1962.

(SEAL)
Attest:

ERNEST W. SWIDER
Attesting Officer

DAVID L. LADD
Commissioner of Patents